US011208087B2

(12) United States Patent
Foerch

(10) Patent No.: US 11,208,087 B2
(45) Date of Patent: Dec. 28, 2021

(54) CONTROL DEVICE AND METHOD FOR INCREASING AT LEAST A BRAKE PRESSURE IN AT LEAST ONE WHEEL-BRAKE CYLINDER OF A BRAKE SYSTEM OF A VEHICLE

(71) Applicant: Robert Bosch GmbH, Stuttgart (DE)

(72) Inventor: Dirk Foerch, Neuenstadt/Stein (DE)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 16/330,420

(22) PCT Filed: Jul. 12, 2017

(86) PCT No.: PCT/EP2017/067538
§ 371 (c)(1),
(2) Date: Mar. 5, 2019

(87) PCT Pub. No.: WO2018/046168
PCT Pub. Date: Mar. 15, 2018

(65) Prior Publication Data
US 2020/0223415 A1 Jul. 16, 2020

(30) Foreign Application Priority Data

Sep. 7, 2016 (DE) .......................... 102016216973.4

(51) Int. Cl.
*B60T 13/74* (2006.01)
*B60T 13/68* (2006.01)
(Continued)

(52) U.S. Cl.
CPC .............. *B60T 13/686* (2013.01); *B60T 8/17* (2013.01); *B60T 8/176* (2013.01); *B60T 13/161* (2013.01);
(Continued)

(58) Field of Classification Search
CPC .... B60T 13/745; B60T 13/676; B60T 13/161; B60T 8/4072; B60T 8/4081
See application file for complete search history.

(56) References Cited

U.S. PATENT DOCUMENTS 6,305,758 B1 * 10/2001 Hageman ................ B60T 8/326
303/113.4
6,366,236 B1 4/2002 Farmer et al.
(Continued)

FOREIGN PATENT DOCUMENTS

CN 103552557 A 2/2014
CN 105073530 A 11/2015
(Continued)

OTHER PUBLICATIONS

International Search Report for PCT/EP2017/067538, dated Oct. 16, 2017.

*Primary Examiner* — Bradley T King
(74) *Attorney, Agent, or Firm* — Norton Rose Fulbright US LLP; Gerard Messina

(57) ABSTRACT

A control device is described for a brake system of a vehicle, having an electronics device that is designed to operate a motorized piston-cylinder device in a pressure buildup mode and simultaneously to control or to hold at least one first separating valve, via which at least one wheel brake cylinder is connected to a master brake cylinder, in its closed state, and to control or to hold at least one second separating valve, via which the at least one wheel brake cylinder is connected to the motorized piston-cylinder device, in its open state, and to operate the motorized piston-cylinder device in a suctioning mode, and at the same time to control the at least one second separating valve to its closed state, the electronics device being in addition designed to control the at least one first separating valve to its open state at least at times during the suctioning mode. A method is also described for increas- (Continued)

ing at least one brake pressure in at least one wheel brake cylinder of a brake system of a vehicle.

13 Claims, 2 Drawing Sheets

(51) Int. Cl.
*B60T 8/17* (2006.01)
*B60T 8/176* (2006.01)
*B60T 13/16* (2006.01)
*B60T 13/58* (2006.01)

(52) U.S. Cl.
CPC ........... *B60T 13/58* (2013.01); *B60T 2270/10* (2013.01); *B60T 2270/402* (2013.01)

(56) References Cited

U.S. PATENT DOCUMENTS

| | | | | |
|---|---|---|---|---|
| 9,221,449 | B2* | 12/2015 | Yang | B60T 13/745 |
| 9,487,201 | B2* | 11/2016 | Linden | F04B 5/02 |
| 10,730,501 | B2* | 8/2020 | Ganzel | B60T 13/686 |
| 2003/0201669 | A1* | 10/2003 | Yokoyama | B60T 8/42 |
| | | | | 303/113.4 |
| 2012/0112525 | A1* | 5/2012 | Shimada | B60T 8/442 |
| | | | | 303/10 |
| 2017/0072928 | A1* | 3/2017 | Kim | B60T 11/22 |
| 2017/0109644 | A1 | 4/2017 | Nariyambut Murali | |
| 2018/0126970 | A1* | 5/2018 | Leiber | B60T 8/4081 |
| 2018/0148031 | A1* | 5/2018 | Knechtges | B60T 8/4077 |
| 2018/0215366 | A1* | 8/2018 | Leiber | B60T 13/686 |
| 2019/0023246 | A1* | 1/2019 | Wagner | B60T 13/146 |
| 2019/0100189 | A1* | 4/2019 | Ganzel | B60T 7/042 |
| 2019/0322261 | A1* | 10/2019 | Hienz | B60T 13/58 |
| 2019/0359191 | A1* | 11/2019 | Wagner | B60T 8/4081 |
| 2020/0062233 | A1* | 2/2020 | Yu | B60T 17/221 |

FOREIGN PATENT DOCUMENTS

| | | |
|---|---|---|
| CN | 105270370 A | 1/2016 |
| DE | 102009007395 A1 | 10/2009 |
| DE | 102014215379 A1 | 2/2016 |
| DE | 102014222759 A1 | 5/2016 |
| DE | 102014225587 A1 | 6/2016 |
| JP | H10239429 A | 9/1998 |
| JP | 2013101113 A | 5/2013 |
| WO | 2017057056 A1 | 4/2017 |

* cited by examiner

CONTROL DEVICE AND METHOD FOR INCREASING AT LEAST A BRAKE PRESSURE IN AT LEAST ONE WHEEL-BRAKE CYLINDER OF A BRAKE SYSTEM OF A VEHICLE

FIELD OF THE INVENTION

The present invention relates to a control device for a brake system of a vehicle and to a brake system for a vehicle. The present invention also relates to a method for increasing at least one brake pressure in at least one wheel brake cylinder of a brake system of a vehicle. In addition, the present invention relates to a method for operating a brake system of a vehicle.

BACKGROUND INFORMATION

In German Published Patent Application No. 10 2014 222 759, a brake system for a vehicle is described that is equipped with a motorized piston-cylinder device in addition to a master brake cylinder of the brake system. Each wheel brake cylinder of the brake system is connected to the master brake cylinder via an associated first separating valve, and is connected to the motorized piston-cylinder device via an associated second separating valve. Through an operation of the motorized piston-cylinder device, when the first separating valves are closed and when the second separating valves are open, brake fluid is to be capable of being transferred from the motorized piston-cylinder device into the wheel brake cylinder, thus making it possible to increase at least one brake pressure in the wheel brake cylinders. Moreover, brake fluid is to be capable of being suctioned from a brake fluid reservoir of the brake system into the motorized piston-cylinder device.

SUMMARY

The present invention creates a control device for a brake system of a vehicle, a brake system for a vehicle, a method for increasing at least one brake pressure in at least one wheel brake cylinder of a brake system of a vehicle, and a method for operating a brake system of a vehicle.

Using the present invention, it is possible to bridge over a reload duration, i.e. a temporal duration required for the suctioning of brake fluid from the brake fluid reservoir into the connected motorized piston-cylinder device, by transferring brake fluid from the master brake cylinder into the at least one wheel brake cylinder connected thereto, via the at least one open first separating valve. In this way, the brake pressure in the at least one wheel brake cylinder can be increased despite the suctioning carried out at the same time. The temporal duration of the suctioning/reload duration thus has no influence, or hardly any influence, on the time required to reach at least a target brake pressure in the at least one wheel brake cylinder. Correspondingly, the duration of the suctioning/reload duration has no, or hardly any, influence on a brake path by which the vehicle is braked/ brought to a standstill on the basis of a buildup of brake pressure in the at least one wheel brake cylinder.

In an advantageous specific embodiment of the control device, the electronics device is designed to control the first separating valve, during the suctioning mode, to its open state at least at times only if a pressure in the master brake cylinder is greater than at least one brake pressure in the at least one wheel brake cylinder. The control device thus makes targeted use of situations in which a driver brakes into the master brake cylinder by actuating a brake actuating element/brake pedal, and thereby provides a pressure (or volume) adequate for transferring brake fluid from the master brake cylinder into the at least one wheel brake cylinder. The specific embodiment described here of the control device thus gives the driver a possibility for supporting the increase in brake pressure in the at least one wheel brake cylinder when suctioning/reloading, through the actuation of the brake actuating element.

Preferably, the electronics device is in addition designed to, after the suctioning mode, control or hold the at least one first separating valve in its closed state, to control the at least one second separating valve to its open state, and to continue to operate the motorized piston-cylinder device in the pressure buildup mode. After a brief interruption of the pressure buildup mode in order to suction adequate brake fluid from the brake fluid reservoir into the motorized piston-cylinder device using the suctioning mode, the pressure buildup mode can in this way be further continued.

As an advantageous development, the electronics device can in addition be designed to, during the further operation of the motorized piston-cylinder device in the pressure buildup mode, control the at least one first separating valve to its open state for a specified, defined, or anticipated time interval that corresponds to a brake fluid volume transferred from the master brake cylinder into the at least one wheel brake cylinder during the suctioning mode. Alternatively, the electronics device can also be designed to, after the suctioning mode, control the at least one first separating valve, which is open at least at times during the suctioning mode, to its closed state with a delay of a specified, defined, or anticipated delay time that corresponds to the brake fluid volume transferred from the master brake cylinder into the at least one wheel brake cylinder during the suctioning mode. Through the brief opening of the at least one first separating valve or the delayed closing of the at least one first separating valve, a volume compensation can be carried out, so that (despite the transferring of brake fluid from the master brake cylinder into the at least one wheel brake cylinder during the suctioning mode) a standardized brake fluid quantity and a pressure (corresponding to a driver's braking force and to a specified driver's braking force/ pressure relation) are present in the master brake cylinder.

In a further advantageous specific embodiment of the control device, the electronics device is designed to carry out, through the operation of the motorized piston-cylinder device in the pressure buildup mode, an anti-lock regulation in the at least one wheel brake cylinder. Frequently, antilocking regulation has to be carried out for a comparatively long time during deceleration/braking of vehicles, in which a buildup/re-buildup of at least a target brake pressure by the motorized piston-cylinder device has to be interrupted for suctioning, in order to refill the motorized piston-cylinder device with brake fluid. In the specific embodiment described here of the control device, however, it is ensured that even during the suctioning, the buildup/re-buildup of the at least one target brake pressure is continued by opening the at least one first separating valve.

The advantages described above also provide a brake system for a vehicle having a corresponding control device, the master brake cylinder, the brake fluid reservoir, the at least one wheel brake cylinder, the motorized piston-cylinder device, the at least one first separating valve via which the at least one wheel brake cylinder is connected to the master brake cylinder, and the at least one second separating valve via which the at least one wheel brake cylinder is connected to the motorized piston-cylinder device.

A carrying out of a corresponding method for increasing at least one brake pressure in at least one wheel brake cylinder of the brake system of a vehicle also brings about the advantages described above. It is to be noted that the method for increasing at least one brake pressure in at least one wheel brake cylinder of a brake system of a vehicle can be further developed according to the above-described specific embodiments of the control device.

In addition, a corresponding method for operating a brake system of a vehicle also provides the advantages described above. The method for operating a brake system of a vehicle can also be further developed in accordance with the above-described specific embodiments of the control device.

DETAILED DESCRIPTION

Figure 1:
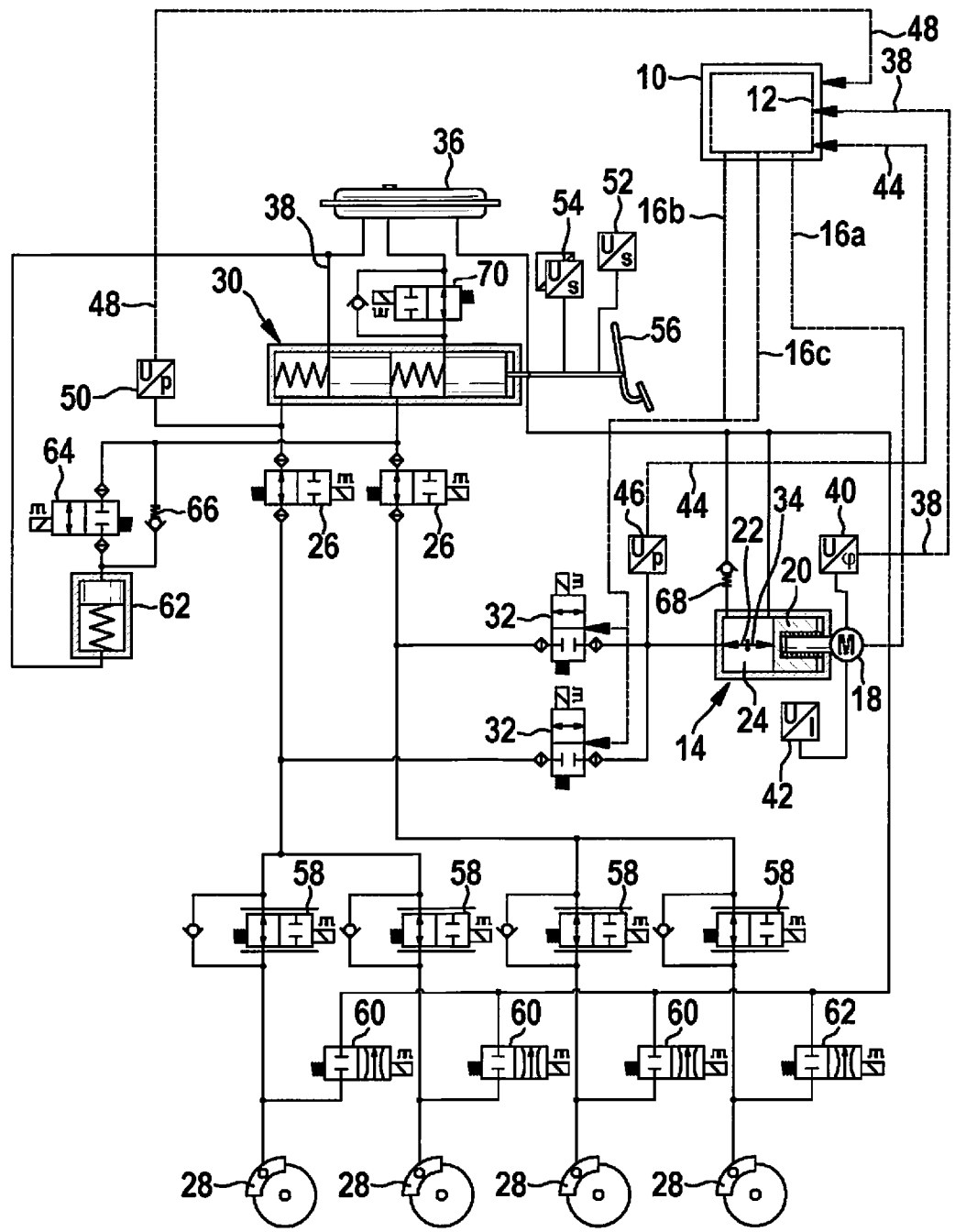
FIG. 1 shows a schematic representation of the control device, or the brake system equipped therewith.

FIG. 1 shows a schematic representation of a control device, or of the brake system equipped therewith.

Control device 10, shown schematically in FIG. 1, may be used in a brake system of a vehicle/motor vehicle. It is expressly to be noted that the applicability of control device 10 is limited neither to a particular type of brake system nor to a specific vehicle type/motor vehicle type. The brake system shown schematically in FIG. 1 is realized, merely as an example, as a hydraulic "one-box brake system."

Control device 10 has an electronics device 12 that is designed to operate a motorized piston-cylinder device 14 of the brake system equipped with control device 10 (using at least one first control signal 16a) in a pressure buildup mode. For this purpose, a motor 18 of motorized piston-cylinder device 14 can be controlled by the at least one first control signal 16a (in the pressure buildup mode) in such a way that, by an operation of motor 18, at least one piston 20 of motorized piston-cylinder device 14 can be displaced/is displaced into a braking device 22. Via the piston 20 displaced into braking device 22, brake fluid is capable of being pressed out/is pressed out from at least one storage volume 24 of motorized piston-cylinder device 14. Moreover, electronics device 12 is designed to control or to hold, during the pressure buildup mode (or the operation of motorized piston-cylinder device 14 in the pressure buildup mode), at least one first separating valve 26, via which at least one wheel brake cylinder 28 of the brake system is connected to a master brake cylinder 30 of the brake system, in its closed state (using at least one second control signal 16b). In this way, electronics device 12 can ensure that during operation of motorized piston-cylinder device 14 in the pressure buildup mode the at least one wheel brake cylinder 28 is/remains decoupled from master brake cylinder 30. In addition, electronics device 12 is designed to control or to hold at least one second separating valve 32, via which the at least one wheel brake cylinder 28 is connected to the motorized piston-cylinder device 14, in its open state (using at least one third control signal 16c). Electronics device 12 thus also ensures that the brake fluid pressed out from the at least one storage volume 24 of motorized piston-cylinder device 14 is displaced into the at least one wheel brake cylinder 28 via the at least one open second separating valve 32. Thus, through the operation of motorized piston-cylinder device 14 in the pressure buildup mode, at least one brake pressure can be increased in the at least one wheel brake cylinder 28.

It frequently occurs that during operation of motorized piston-cylinder device 14 in pressure buildup mode in order to increase the at least one brake pressure in the at least one wheel brake cylinder 28, a brake fluid volume that can (currently) be pressed out from the at least one storage volume 24 is consumed, or is smaller than a specified minimum volume. However, if this case occurs, electronics device 12 is designed to operate motorized piston-cylinder device 14 in a suctioning mode (via the at least one first control signal 16a). In the suctioning mode, motor 18 is controlled (by the at least one first control signal 16a) in such a way that the at least one piston 20 is displaceable/is displaced in a counter-direction 34 (directed opposite braking direction 22). Brake fluid can be suctioned/is suctioned from a brake fluid reservoir 36 of the brake system into the at least one storage volume 24 by the at least one piston 20 displaced in counter-direction 34. Moreover, electronics device 12 is designed to control the at least one second separating valve 32 to its closed state (using the at least one third control signal 16c) during the suctioning mode (or the operation of motorized piston-cylinder device 14 in suctioning mode). During a suctioning of brake fluid from brake fluid reservoir 36 into the at least one storage line 24, the at least one wheel brake cylinder 28 is thus decoupled from motorized piston-cylinder device 14.

In addition, electronics device 12 is also designed to control the at least one first separating valve 26 at least at times to its open state (using the at least one second control signal 16b) during the suctioning mode (i.e. the operation of piston-cylinder device 14 in the suctioning mode). Therefore, during the suctioning of brake fluid from brake fluid reservoir 36 into the at least one storage volume 24 as well, a displacement of brake fluid from master brake cylinder 30 into the at least one wheel brake cylinder 28 via the at least one open first separating valve 26 can also be carried out, whereby the at least one brake pressure in the at least one wheel brake cylinder 28 can be increased despite the suctioning that is simultaneously carried out. An interruption of an increase of brake pressure in the at least one wheel brake cylinder 28 therefore does not have to be accepted (along with the simultaneous suctioning). Likewise, the bringing about of the suctioning does not require any prolongation of a braking path along which the vehicle equipped with control device 10 is brought to a standstill, based on the increase in brake pressure in the at least one wheel brake cylinder 28.

Optionally, if the respective brake system is equipped with at least two first separating valves 26, it is possible for only one of the at least two first separating valves 26 to be controlled, by electronics device 12, to be in its open state at least at times during operation of motorized piston-cylinder device 14 in the suctioning mode. Alternatively, however, it is also possible for all of the at least two first separating valves 26 to be controlled by electronics device 12 to be in the open state at least at times during operation of motorized piston-cylinder device 14 in the suctioning mode.

Electronics device 12 can recognize the case in which the brake fluid volume that can (currently) be pressed out of the at least one storage volume 24 is consumed or is smaller than a specified minimum volume, for example through an evaluation by electronics device 12 of at least one sensor signal 38 of a sensor 40 and/or 42 of motorized piston-cylinder device 14, such as a rotational rate sensor 40 and/or a motor current sensor 42. As an alternative or supplement thereto, electronics device 12 can also be designed to correspondingly evaluate at least one pressure signal 44 of a pressure sensor 46 connected to the at least one storage volume 24. The possibilities named here by which electronics device 12 can recognize whether the brake fluid volume that can (currently) be pressed out from the at least one storage volume 24 is consumed or is smaller than the specified minimum volume are however to be interpreted only as examples.

Advantageously, electronics device 12 is designed to carry out an anti-locking regulation in the at least one wheel brake cylinder 28 through the operation of motorized piston-cylinder device 14 in pressure buildup mode. Frequently, especially during execution of an anti-locking regulation, it comes about that the brake fluid volume that can (currently) be pressed out from the at least one storage volume 24 of the motorized piston-cylinder device 14 that is used is consumed or is smaller than a specified minimum volume, and therefore a suctioning of brake fluid from brake fluid reservoir 36 is necessary. However, using control device 10 described here, it can be ensured that a duration/reload duration required to carry out the suctioning can be bridged over by the opening at least at times of the at least one first separating valve 26.

Preferably, electronics device 12 is also designed to control the at least one first separating valve 26 to its open state at least at times during the suctioning mode (i.e. during operation of the motorized piston-cylinder device in the suctioning mode) only when a pressure in master brake cylinder 30 is greater than the at least one brake pressure in the at least one wheel brake cylinder 28. In situations in which a driver of the vehicle equipped with control device 10 brakes into master cylinder 30 by actuating a brake actuating element/brake pedal 56, control device 10 can thus make targeted use of a volume (or a correspondingly adequately high pressure) in master brake cylinder 30 that is adequate for increasing the at least one brake pressure in the at least one wheel brake cylinder 28 for the desired brake pressure increase (during operation of motorized piston-cylinder device 14 in the suctioning mode). Because the driver, especially in the case of an emergency braking, will frequently press very strongly on brake actuating element 56, in such a situation there will above all be no delayed brake pressure increase and no brake path increase (despite the intermittently necessary suctioning of brake fluid from brake fluid reservoir 36 into the at least one storage volume 24). The advantageous design of electronics device 12 thus brings about a rapid deceleration/braking of the vehicle, especially in such a situation.

For example, electronics device 12 can be designed to evaluate at least one pressure signal 48 of at least one pressure sensor 50 connected to master brake cylinder 30 relating to the (current) pressure in master brake cylinder 30. In addition, at least one sensor signal (not shown) of a brake actuating element sensor 52 and/or 54, such as a rod path sensor 52 and/or a difference path sensor 54, can also be capable of being evaluated by electronics device 12 in order to estimate/calculate the pressure in master brake cylinder 30. Electronics device 12 can also be designed to estimate/calculate the at least one brake pressure in the at least one wheel brake cylinder 28. Alternatively, the brake system can also have at least one pressure sensor (not shown) by which the at least one brake pressure in the at least one wheel brake cylinder 28 can be measured. In addition, at least one value relating to the pressure in master brake cylinder 30 and/or relating to the at least one brake pressure in the at least one wheel brake cylinder 28 can also be provided to electronics device 12 via a vehicle bus (not shown).

Of course, electronics device 12 can in addition also be designed to, after the suctioning mode (or the operation of motorized piston-cylinder device 14 in the suctioning mode), control or hold the at least one first separating valve 26 in its closed state, to control the at least one second separating valve 32 to its closed state, and to continue to operate motorized piston-cylinder device 14 in the pressure buildup mode. This is advantageous especially if at least one specified/desired target brake pressure is not yet built up in the at least one wheel brake cylinder 28, even after operation of motorized piston-cylinder device in suctioning mode (and the possibly carried out transferring of brake fluid from the master brake cylinder into the at least one wheel brake cylinder 28 via the at least one open first separating valve 26). After an interruption of the pressure buildup mode for the suctioning of brake fluid from brake fluid reservoir 36 into the at least one storage line 24, the pressure buildup mode can thus be further continued.

In an advantageous development, electronics device 12 is additionally designed to control the at least one first separating valve 26 to its open state for a (fixedly) predetermined, defined, or anticipated time interval during the further operation of motorized piston-cylinder device 14 in the pressure buildup mode. The respective time interval for which the at least one first separating valve 26 is controlled to its open state preferably corresponds to a brake fluid volume transferred from master brake cylinder 30 into the at least one wheel brake cylinder 28 during the suctioning mode. For example, the brake fluid volume transferred from master brake cylinder 30 into the at least one wheel brake cylinder 28 during the suctioning mode can be calculated or estimated, and subsequently the time interval can be correspondingly determined. Likewise, after a controlling of the at least one first separating valve 26 to its open state, waiting can take place until a quantity of brake fluid corresponding to the brake fluid volume transferred from master brake cylinder 30 into the at least one wheel brake cylinder 28 during the suctioning mode is transferred back (or a corresponding pressure is present in master brake cylinder 30) before controlling the at least one first separating valve 26 to its closed state. The brake fluid volume previously transferred from master brake cylinder 30 into the at least one wheel brake cylinder 28 (as a "lost" volume of master brake cylinder 30) can usually easily be displaced into master brake cylinder 30 by the motor force that can be applied by motor 18 of motorized piston-cylinder device 14. Therefore, in this development of control device 10, a volume compensation is possible that ensures (despite the transferring of the brake fluid volume from master brake cylinder 30 into the at least one wheel brake cylinder 28, via the at least one open first separating valve 26, during the suctioning mode), that a standard brake fluid quantity and a pressure corresponding to the actuation of brake actuating element 56 are present in master brake cylinder 30. As a result, fluctuations of the brake fluid quantity and of the pressure in master brake cylinder 30 are brief enough that the driver actuating brake actuating element 56 will not notice them, or will hardly notice them. A further advantage of this specific embodiment of control device 10 is that as soon as a further suctioning is carried out shortly after an already-carried out suctioning, during the later suctioning as well the at least one brake pressure in the at least one wheel brake cylinder 28 can be further increased by opening, at least at times, the at least one first separating valve 26. Although as a rule the quantity of brake fluid in master brake cylinder 30 is relatively small, the "renewable brake fluid quantity" in master brake cylinder 30 can be used to bridge over a multiple suctioning.

Alternatively, electronics device 12 can also be designed to, after the suctioning mode, control the at least one first separating valve 26, open at least at times during the suctioning mode, to its closed state with a delay of a (fixedly) specified, defined, or anticipated delay time. Preferably, the (fixedly) specified, defined, or anticipated delay time corresponds to the brake fluid volume transferred from master brake cylinder 30 into the at least one wheel brake cylinder 28 during the suctioning mode. With regard to the possibilities for defining or anticipating the delay time, reference is made to the statements in the preceding paragraph.

The brake system shown schematically in FIG. 1 also has, in addition to the brake system components described above, one wheel inlet valve 58 and one wheel outlet valve 60 per wheel brake cylinder 28. Moreover, a simulator 62 is connected to master brake cylinder 30 via a simulator separating valve 64 and an excess pressure valve 66 situated parallel to simulator simulating valve 64. (Another excess pressure valve 68 connects the at least one storage volume 24 of motorized piston-cylinder device 14 to brake fluid reservoir 36.) In addition, master brake cylinder 30 is connected to brake fluid reservoir 36 via a reservoir separating valve 70 (having a check valve situated parallel thereto). However, it is to be noted that the equipping of the brake system with the brake system components described in this paragraph is merely optional.

The advantages described above of control device 10 are also brought about by a brake system equipped therewith for a vehicle having at least master brake cylinder 30, brake fluid reservoir 36, the at least one wheel brake cylinder 28, motorized piston-cylinder device 14, the at least one first separating valve 26 via which the at least one wheel brake cylinder 28 is connected to master brake cylinder 30, and the at least one second separating valve 32, via which the at least one wheel brake cylinder 28 is connected to motorized piston-cylinder device 14.

Figure 2:
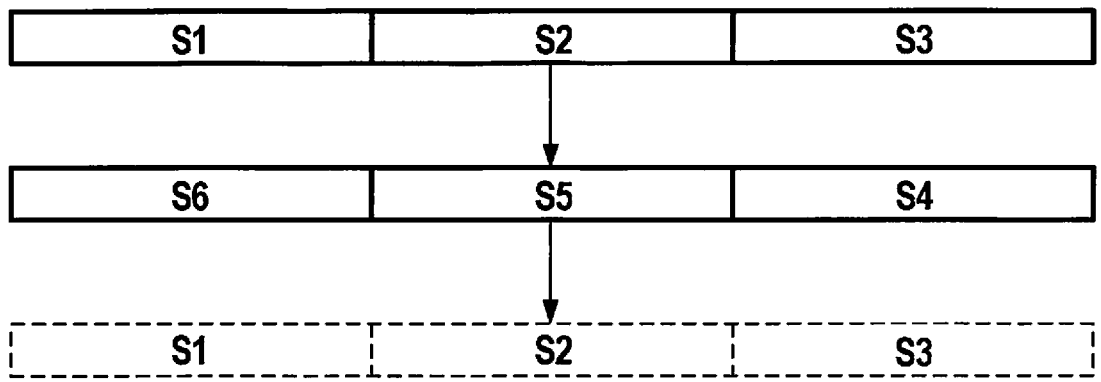
FIG. 2 shows a flow diagram explaining a specific embodiment of the method for increasing at least one brake pressure in at least one wheel brake cylinder of a brake system of a vehicle.

FIG. 2 shows a flow diagram explaining a specific embodiment of the method for increasing at least one brake pressure in at least one wheel brake cylinder of a brake system of a vehicle.

The method described below can for example be carried out using the brake system explained above. However, it is to be noted that the practicability of the method is not limited to the use of this type of brake system.

Method steps S1 through S3 are carried out (almost) simultaneously, in order to transfer brake fluid into the at least one wheel brake cylinder using a motorized piston-cylinder device of the brake system. As a method step S1, at least one first separating valve, via which the at least one wheel brake cylinder is connected to a master brake cylinder of the brake system, is controlled or held in its closed state. As a method step S2, at least one second separating valve, via which the at least one wheel brake cylinder is connected to the motorized piston-cylinder device, is controlled or held in its open state. Moreover, in a method step S3 at least one piston of the motorized piston-cylinder device is displaced (in a braking direction) in such a way that brake fluid is pressed out from at least one storage volume (limited by the at least one piston) of the motorized piston-cylinder device. The pressed-out brake fluid is transferred into the at least one wheel brake cylinder via the at least one open second separating valve.

If it is recognized that a brake fluid volume that can (currently) be pressed out from the at least one storage volume is consumed or is smaller than a specified minimum volume, method steps S4 through S6 are carried out in order to bring about a suctioning of brake fluid from a brake fluid reservoir of the brake system into the at least one storage volume. This takes place by drawing back the at least one piston (in a counter-direction oriented opposite to the braking direction), as a method step S4. Simultaneously, or nearly simultaneously, as a method step S5 the at least one second separating valve is controlled to its closed state during the suctioning. In addition, during the suctioning, in a method step S6 the at least one first separating valve is controlled to its open state at least at times. In this way, a carrying out of the method described here also brings about the advantages explained above.

Preferably, the at least one first separating valve is controlled (as method step S6) to its open state at least at times during the suctioning only if a pressure in the master brake cylinder is greater than the at least one brake pressure in the at least one wheel brake cylinder. Possibilities for recognizing such a situation are described above.

After the suctioning brought about by method steps S4 through S6, method steps S1 through S3 can be carried out again, whereby the at least one first separating valve is controlled or held in its closed state, the at least one second separating valve is controlled to its open state, and the method of the at least one piston (in the braking direction) for pressing brake fluid out from the at least one storage volume is continued.

Figure 3:
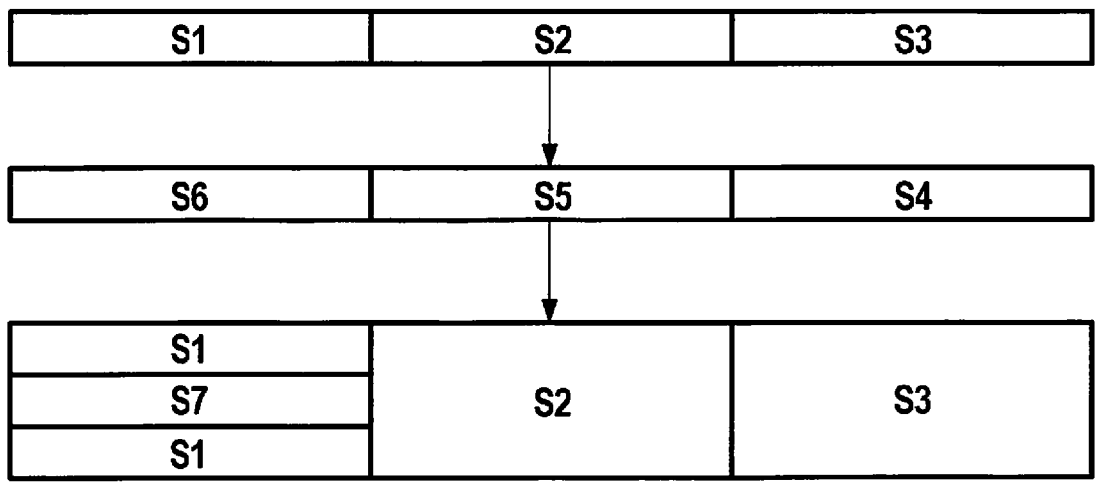
FIG. 3 shows a flow diagram explaining a specific embodiment of the method for operating a brake system of a vehicle.

FIG. 3 shows a flow diagram explaining a specific embodiment of the method for operating a brake system of a vehicle.

The method described below for operating a brake system of a vehicle can also be carried out using the brake system explained above. However, it is to be noted that the practicability of the method described below is not limited to the use of this type of brake system.

In the method described here, another method step S7 is carried out during the method of the at least one piston (in the braking direction) for pressing brake fluid out from the at least one storage volume. In method step S7, the at least one first separating valve is controlled to its open state for a specified, defined, or anticipated time interval that corresponds to a brake fluid volume transferred from the master brake cylinder into the at least one wheel brake cylinder during the suctioning. Possibilities for defining or anticipating the time interval are described above.

Alternatively, after the suctioning brought about by method steps S4 through S6, the method step S1 can also be carried out with a delay, relative to method steps S2 and S3, of a specified, defined, or anticipated delay time that corresponds to the brake fluid volume transferred from the master brake cylinder into the at least one wheel brake cylinder during the suctioning mode.

Method steps S1 through S3 for increasing the at least one brake pressure in the at least one wheel brake cylinder can be carried out for an anti-locking regulation in the at least one wheel brake cylinder.

What is claimed is:

1. A control device for a brake system of a vehicle, the control device:

operating a motorized piston-cylinder device of the brake system in a pressure buildup mode, in which brake fluid can be pressed out from at least one storage volume of the motorized piston-cylinder device by at least one piston of the motorized piston-cylinder device, displaced in a braking direction; and one of controlling and holding, during the pressure buildup mode, at least one first separating valve, via which at least one wheel brake cylinder of the brake system is connected to a master brake cylinder of the brake system, in a closed state of the first separating valve, and one of controlling and holding at least one second separating valve, via which the at least one wheel brake cylinder is connected to the motorized piston-cylinder device, in an open state of the second separating valve, wherein upon determining that a brake fluid volume that can be pressed out from the at least one storage volume is consumed or is smaller than a specified minimum volume, the control device:

operates the motorized piston-cylinder device in a suctioning mode in which brake fluid can be suctioned from a brake fluid reservoir of the brake system into the at least one storage volume by the at least one piston displaced in a counter-direction, and controls, during the suctioning mode, the at least one second separating valve to a closed state of the second separating valve, wherein the control device controls the at least one first separating valve to an open state of the first separating valve at least at a time during the suctioning mode, wherein the control device controls the at least one first separating valve to its open state at least at times during the suctioning mode only if a pressure in the master brake cylinder is greater than at least one brake pressure in the at least one wheel brake cylinder.

2. The control device as recited in claim 1, wherein the control device, after the suctioning mode, one of controls and holds the at least one first separating valve in its closed state, to control the at least one second separating valve to its open state, and to continue to operate the motorized piston-cylinder device in the pressure buildup mode.

3. The control device as recited in claim 1, wherein the control device carries out an anti-locking regulation in the at least one wheel brake cylinder through an operation of the motorized piston-cylinder device in the pressure buildup mode.

4. A control device for a brake system of a vehicle, the control device:

operating a motorized piston-cylinder device of the brake system in a pressure buildup mode, in which brake fluid can be pressed out from at least one storage volume of the motorized piston-cylinder device by at least one piston of the motorized piston-cylinder device, displaced in a braking direction; and one of controlling and holding, during the pressure buildup mode, at least one first separating valve, via which at least one wheel brake cylinder of the brake system is connected to a master brake cylinder of the brake system, in a closed state of the first separating valve, and one of controlling and holding at least one second separating valve, via which the at least one wheel brake cylinder is connected to the motorized piston-cylinder device, in an open state of the second separating valve, wherein upon determining that a brake fluid volume that can be pressed out from the at least one storage volume is consumed or is smaller than a specified minimum volume, the control device:

operates the motorized piston-cylinder device in a suctioning mode in which brake fluid can be suctioned from a brake fluid reservoir of the brake system into the at least one storage volume by the at least one piston displaced in a counter-direction, and controls, during the suctioning mode, the at least one second separating valve to a closed state of the second separating valve, wherein the control device controls the at least one first separating valve to an open state of the first separating valve at least at a time during the suctioning mode, wherein the control device, after the suctioning mode, one of controls and holds the at least one first separating valve in its closed state, to control the at least one second separating valve to its open state, and to continue to operate the motorized piston-cylinder device in the pressure buildup mode, and wherein the control device, during a further operation of the motorized piston-cylinder device in the pressure buildup mode, controls the at least one first separating valve to its open state for a specified time interval that corresponds to a brake fluid volume transferred from the master brake cylinder into the at least one wheel brake cylinder during the suctioning mode.

5. A control device for a brake system of a vehicle, the control device:

operating a motorized piston-cylinder device of the brake system in a pressure buildup mode, in which brake fluid can be pressed out from at least one storage volume of the motorized piston-cylinder device by at least one piston of the motorized piston-cylinder device, displaced in a braking direction; and one of controlling and holding, during the pressure buildup mode, at least one first separating valve, via which at least one wheel brake cylinder of the brake system is connected to a master brake cylinder of the brake system, in a closed state of the first separating valve, and one of controlling and holding at least one second separating valve, via which the at least one wheel brake cylinder is connected to the motorized piston-cylinder device, in an open state of the second separating valve, wherein upon determining that a brake fluid volume that can be pressed out from the at least one storage volume is consumed or is smaller than a specified minimum volume, the control device:

operates the motorized piston-cylinder device in a suctioning mode in which brake fluid can be suctioned from a brake fluid reservoir of the brake system into the at least one storage volume by the at least one piston displaced in a counter-direction, and controls, during the suctioning mode, the at least one second separating valve to a closed state of the second separating valve, wherein the control device controls the at least one first separating valve to an open state of the first separating valve at least at a time during the suctioning mode, wherein the control device, after the suctioning mode, one of controls and holds the at least one first separating valve in its closed state, to control the at least one second separating valve to its open state, and to continue to operate the motorized piston-cylinder device in the pressure buildup mode, and wherein the control device, after the suctioning mode, controls the at least one first separating valve, open at least at a time during the suctioning mode, to its closed state with a delay of a specified delay time that corresponds to the brake fluid volume transferred from the master brake cylinder into the at least one wheel brake cylinder during the suctioning mode.

6. A brake system for a vehicle, comprising:
a control device;
a master brake cylinder;
a brake fluid reservoir;
at least one wheel brake cylinder;
a motorized piston-cylinder device;
at least one first separating valve via which the at least one wheel brake cylinder is connected to the master brake cylinder; and
at least one second separating valve via which the at least one wheel brake cylinder is connected to the motorized piston-cylinder device, wherein the control device:
   operates the motorized piston-cylinder device of the brake system in a pressure buildup mode, in which brake fluid can be pressed out from at least one storage volume of the motorized piston-cylinder device by at least one piston of the motorized piston-cylinder device, displaced in a braking direction; and
   one of controls and holds, during the pressure buildup mode, the at least one first separating valve, via which the at least one wheel brake cylinder of the brake system is connected to the master brake cylinder of the brake system, in a closed state of the first separating valve, and
   one of controls and holds the at least one second separating valve, via which the at least one wheel brake cylinder is connected to the motorized piston-cylinder device, in an open state of the second separating valve, wherein upon determining that a brake fluid volume that can be pressed out from the at least one storage volume is consumed or is smaller than a specified minimum volume, the control device:
      operates the motorized piston-cylinder device in a suctioning mode in which brake fluid can be suctioned from the brake fluid reservoir of the brake system into the at least one storage volume by the at least one piston displaced in a counter-direction, and
      controls, during the suctioning mode, the at least one second separating valve to a closed state of the second separating valve, wherein the control device controls the at least one first separating valve to an open state of the first separating valve at least at a time during the suctioning mode, wherein the control device controls the at least one first separating valve to its open state at least at times during the suctioning mode only if a pressure in the master brake cylinder is greater than at least one brake pressure in the at least one wheel brake cylinder.

7. A method for increasing at least one brake pressure in at least one wheel brake cylinder of a brake system of a vehicle, comprising:
   one of controlling and holding at least one first separating valve, via which the at least one wheel brake cylinder is connected to a master brake cylinder of the brake system, in its closed state;
   one of controlling and holding at least one second separating valve, via which the at least one wheel brake cylinder is connected to a motorized piston-cylinder device of the brake system, in its open state;
   displacing at least one piston of the motorized piston-cylinder device in such a way that brake fluid is pressed out from at least one storage volume of the motorized piston-cylinder device; and
   in response to determining that a brake fluid volume that can be pressed out from the at least one storage volume is consumed or is smaller than a specified minimum volume, suctioning brake fluid from a brake fluid reservoir of the brake system into the at least one storage volume by drawing back the at least one piston, the at least one second separating valve being controlled to its closed state during the suctioning, wherein during the suctioning, the at least one first separating valve is controlled at least at a time to its open state, wherein the at least one first separating valve is controlled to its open state at least at times during the suctioning only if a pressure in the master brake cylinder is greater than at least one brake pressure in the at least one wheel brake cylinder.

8. The method as recited in claim 7, wherein, after the suctioning, the at least one first separating valve one of is controlled and is held in its closed state, the at least one second separating valve being controlled to its open state, and the method of the at least one piston for pressing brake fluid out from the at least one storage volume is continued.

9. A method for increasing at least one brake pressure in at least one wheel brake cylinder of a brake system of a vehicle, comprising:
   one of controlling and holding at least one first separating valve, via which the at least one wheel brake cylinder is connected to a master brake cylinder of the brake system, in its closed state;
   one of controlling and holding at least one second separating valve, via which the at least one wheel brake cylinder is connected to a motorized piston-cylinder device of the brake system, in its open state;
   displacing at least one piston of the motorized piston-cylinder device in such a way that brake fluid is pressed out from at least one storage volume of the motorized piston-cylinder device; and
   in response to determining that a brake fluid volume that can be pressed out from the at least one storage volume is consumed or is smaller than a specified minimum volume, suctioning brake fluid from a brake fluid reservoir of the brake system into the at least one storage volume by drawing back the at least one piston, the at least one second separating valve being controlled to its closed state during the suctioning, wherein during the suctioning, the at least one first separating valve is controlled at least at a time to its open state, further comprising controlling the at least one first separating valve to its open state at least at a time during the suctioning only if a pressure in the master brake cylinder is greater than the at least one brake pressure in the at least one wheel brake cylinder.

10. A method for operating a brake system of a vehicle, comprising:
   increasing at least one brake pressure in at least one wheel brake cylinder of the brake system by carrying out a second method for increasing the at least one brake pressure in the at least one wheel brake cylinder of the brake system of the vehicle, the second method comprising:
      one of controlling and holding at least one first separating valve, via which the at least one wheel brake cylinder is connected to a master brake cylinder of the brake system, in its closed state;
      one of controlling and holding at least one second separating valve, via which the at least one wheel brake cylinder is connected to a motorized piston-cylinder device of the brake system, in its open state;

displacing at least one piston of the motorized piston-cylinder device in such a way that brake fluid is pressed out from at least one storage volume of the motorized piston-cylinder device; and in response to determining that a brake fluid volume that can be pressed out from the at least one storage volume is consumed or is smaller than a specified minimum volume, suctioning brake fluid from a brake fluid reservoir of the brake system into the at least one storage volume by drawing back the at least one piston, the at least one second separating valve being controlled to its closed state during the suctioning, wherein during the suctioning, the at least one first separating valve is controlled at least at a time to its open state, and wherein the at least one first separating valve is controlled to its open state at least at times during the suctioning only if a pressure in the master brake cylinder is greater than at least one brake pressure in the at least one wheel brake cylinder.

11. The method as recited in claim 10, wherein an increase of the at least one brake pressure in the at least one wheel brake cylinder is carried out for an anti-locking regulation in the at least one wheel brake cylinder.

12. A method for operating a brake system of a vehicle, comprising:

increasing at least one brake pressure in at least one wheel brake cylinder of the brake system by carrying out a second method for increasing the at least one brake pressure in the at least one wheel brake cylinder of the brake system of the vehicle, the second method comprising:

one of controlling and holding at least one first separating valve, via which the at least one wheel brake cylinder is connected to a master brake cylinder of the brake system, in its closed state;

one of controlling and holding at least one second separating valve, via which the at least one wheel brake cylinder is connected to a motorized piston-cylinder device of the brake system, in its open state;

displacing at least one piston of the motorized piston-cylinder device in such a way that brake fluid is pressed out from at least one storage volume of the motorized piston-cylinder device; and in response to determining that a brake fluid volume that can be pressed out from the at least one storage volume is consumed or is smaller than a specified minimum volume, suctioning brake fluid from a brake fluid reservoir of the brake system into the at least one storage volume by drawing back the at least one piston, the at least one second separating valve being controlled to its closed state during the suctioning, wherein during the suctioning, the at least one first separating valve is controlled at least at a time to its open state, wherein while the method of the at least one piston for pressing brake fluid out from the at least one storage volume is continued, the at least one first separating valve is controlled to its open state for a specified time interval that corresponds to a brake fluid volume transferred from the master brake cylinder into the at least one wheel brake cylinder during the suctioning.

13. A method for operating a brake system of a vehicle, comprising:

increasing at least one brake pressure in at least one wheel brake cylinder of the brake system by carrying out a second method for increasing the at least one brake pressure in the at least one wheel brake cylinder of the brake system of the vehicle, the second method comprising:

one of controlling and holding at least one first separating valve, via which the at least one wheel brake cylinder is connected to a master brake cylinder of the brake system, in its closed state;

one of controlling and holding at least one second separating valve, via which the at least one wheel brake cylinder is connected to a motorized piston-cylinder device of the brake system, in its open state;

displacing at least one piston of the motorized piston-cylinder device in such a way that brake fluid is pressed out from at least one storage volume of the motorized piston-cylinder device; and in response to determining that a brake fluid volume that can be pressed out from the at least one storage volume is consumed or is smaller than a specified minimum volume, suctioning brake fluid from a brake fluid reservoir of the brake system into the at least one storage volume by drawing back the at least one piston, the at least one second separating valve being controlled to its closed state during the suctioning, wherein during the suctioning, the at least one first separating valve is controlled at least at a time to its open state, wherein, after the suctioning, the at least one first separating valve, open at least at a time during the suctioning, is controlled to its closed state with a delay of a specified delay time that corresponds to the brake fluid volume transferred from the master brake cylinder into the at least one wheel brake cylinder during a suctioning mode.

* * * * *